(12) United States Patent
Akamatsu et al.

(10) Patent No.: US 6,402,442 B2
(45) Date of Patent: Jun. 11, 2002

(54) MACHINE TOOL

(75) Inventors: Yoshiaki Akamatsu; Makoto Fujishima, both of Yamatokoriyama (JP)

(73) Assignees: Mori Seiki Co., LTD, Yamatokoriyama (JP); Intelligent Manufacturing Systems International, Sacramento, CA (US)

( * ) Notice: Subject to any disclaimer, the term of this patent is extended or adjusted under 35 U.S.C. 154(b) by 0 days.

(21) Appl. No.: 09/849,269

(22) Filed: May 7, 2001

(30) Foreign Application Priority Data

May 8, 2000 (JP) .......................................... 2000-134509

(51) Int. Cl.⁷ ................................................ B23C 1/00
(52) U.S. Cl. ......................... 409/134; 409/233; 700/177
(58) Field of Search .................................. 409/134, 193, 409/233; 408/16, 8, 9, 10, 11, 710; 700/174, 177

(56) References Cited

U.S. PATENT DOCUMENTS

| | | | | |
|---|---|---|---|---|
| 4,351,029 A | * | 9/1982 | Maxey et al. | ................ 700/177 |
| 4,507,834 A | * | 4/1985 | Chen et al. | ................ 409/134 |
| 4,702,650 A | * | 10/1987 | Golwas et al. | ................ 408/11 |
| 4,708,547 A | * | 11/1987 | Baron | ................ 409/233 |
| 2002/0013639 A1 | * | 1/2002 | Fujishima et al. | ................ 700/177 |

FOREIGN PATENT DOCUMENTS

| | | |
|---|---|---|
| JP | 2-065905 | 3/1990 |
| JP | 9-057581 | 3/1997 |

* cited by examiner

*Primary Examiner*—Daniel W. Howell
(74) *Attorney, Agent, or Firm*—Armstrong, Westerman & Hattori, LLP

(57) ABSTRACT

The present invention provides a machine tool which is adapted to detect the end of the service life of a spring of a clamp unit for fixing a tool to a spindle for systematic replacement of the spring. The machine tool comprises a clamp unit (47) for fixing a tool in a taper hole provided in a spindle, and a controlling section (63) for controlling the operation of the clamp unit. The clamp unit (47) includes a holder for holding a holder portion of the tool, a driving rod coupled to the holder, a driver for moving the driving rod along an axis thereof, and a spring for biasing the driving rod in one direction along the axis thereof. The machine tool further comprises a service life end detecting section (11) for counting the number of times of actuation of the clamp unit (47) and, when the count of the number reaches a predetermined reference actuation number, judging that the service life of the spring ends. With this arrangement, maintenance can systematically be carried out by detecting the end of the service life of the spring.

2 Claims, 6 Drawing Sheets

MACHINE TOOL

BACKGROUND OF THE INVENTION

1. Field of the Invention

The present invention relates to a machine tool having a spindle, a clamp unit for fixing a tool in a taper hole provided in the spindle, and a controlling section for controlling the operation of the clamp unit, wherein the clamp unit includes a holder for holding a holder portion of a tool, a driving rod coupled to the holder, a driver for driving the driving rod along an axis thereof, and a spring for biasing the driving rod in one direction along the axis thereof, whereby the driving rod is moved along the axis thereof by the driver and the spring and the tool is fixed in the taper hole of the spindle with the holder portion thereof held by the holder.

2. Description of Related Art

One exemplary machine tool having a clamp unit of the aforesaid type will hereinafter be described with reference to FIGS. 5 to 7. The machine tool 21 illustrated in FIG. 5 is a so-called vertical machining center. The machine tool 21 includes: a bed 22; a column 23 provided upright on the bed 22; a spindle head 24 rotatably supporting a spindle 25 and supported by the column 23 in a vertically movable manner; a table 26 provided below the spindle head 24 on the bed 22; a tool magazine 30 provided on the left side of the spindle head 24; an automatic tool changer 35 provided at a lower end of the tool magazine 30 for exchanging a tool T attached to the spindle 25 with a tool T stored in the tool magazine 30; a clamp unit 47 as shown in FIG. 6 for fixing the tool T to a front end (lower end) of the spindle 25; and a numerical controller 60 as shown in FIG. 7 for controlling the respective components of the machine tool.

As shown in FIG. 6, the spindle head 24 includes the spindle 25, a housing 40 rotatably supporting the spindle 25 via a bearing 41, and a cover 42 provided at a front end of the housing 40. A taper hole 25a for receiving the tool T is provided in the front end of the spindle 25 (as seen in the direction of an arrow A).

As shown in FIG. 6, the clamp unit 47 includes a collet 48 provided in the spindle 25 for holding a pull stud (holder portion) Ta of the tool T fitted in the taper hole 25a of the spindle 25, a push-pull rod 49 engaged with the collet 48, a driving rod 50 coupled to the push-pull rod 49, coned disc springs 51 for biasing the driving rod 50 in the direction of an arrow B, and a hydraulic cylinder (not shown) for moving the driving rod 50 in the direction of the arrow A.

As shown in FIG. 7, the numerical controller 60 includes a CNC 61, a PLC 62, an input/output interface 65 and the like, and is connected to an external control circuit 66 via the input/output interface 65. The control circuit 66 is connected to an operation panel 67, the clamp unit 47 and the like.

The CNC 61 executes a machining program stored therein to control basic operations of the machine tool 21 such as axial movements of the spindle head 24 and the table 26, and display of a CRT 68. The PLC 62 includes a clamp controlling section 63 and the like, and controls auxiliary operations of the machine tool 21 such as operations of the tool magazine 30, the automatic tool changer 35 and the clamp unit 47. The CRT 68 typically displays the machining program and the coordinates of the current position of the tool.

As described above, the clamp controlling section 63 controls the operation of the clamp unit 47 via the control circuit 66. The clamp controlling section 63 usually drives the hydraulic cylinder (not shown) of the clamp unit 47 to perform a tool clamping or unclamping operation for clamping or unclamping the tool T attached to the spindle 25 upon reception of a tool clamp command or a tool unclamp command applied from the CNC 61 executing the machining program. The tool clamp command or the tool unclamp command can also be manually inputted from the operation panel 67 to cause the clamp unit 47 to perform the tool clamping or unclamping operation. In this case, the tool clamp command or the tool unclamp command inputted from the operation panel 67 is transmitted to the CNC 61 via the control circuit 66, the input/output interface 65 and the PLC 62, and then outputted from the CNC 61 to the clamp controlling section 63. Upon reception of the tool clamp command or the tool unclamp command, the clamp controlling section 63 drives the clamp unit 47.

In the machine tool 21 having the aforesaid construction, the tool T fixed to the spindle 25 is removed (unclamped) from the spindle 25, and the tool T fitted in the taper hole 25a of the spindle 25 is fixed (clamped) to the spindle 25 in the following manner. It is herein assumed that the tool T, the driving rod 50, the push-pull rod 49 and the collet 48 are respectively located in positions as shown in FIG. 6, and the tool T is fixed to the spindle 25.

First, a hydraulic pressure is supplied to the hydraulic cylinder (not shown) to move the driving rod 50 in the direction of the arrow A against a biasing force of the coned disc springs 51, whereby the push-pull rod 49 and the collet 48 are moved in the direction of the arrow A to open a front end of the collet 48 which holds the pull stud Ta of the tool T. Thus, the tool T can be withdrawn from the taper hole 25a of the spindle 25.

Where the tool T is fitted in the taper hole 25a of the spindle 25 in the aforesaid state, the pull stud Ta of the tool T is inserted in the collet 48. When the supply of the hydraulic pressure to the hydraulic cylinder (not shown) is stopped in this state, the driving rod 50 is moved in the direction of the arrow B by the biasing force of the coned disc springs 51 to close the collet 48, whereby the tool T attached to the spindle 25 is held by the collet 48 with the pull stud Ta thereof inserted in the direction of the arrow B. Thus, the tool T is fixed to the spindle 25.

As described above, the clamp unit 47 employs the coned disc springs 51, which naturally have a limited fatigue durability because the coned disc springs 51 are repeatedly subjected to a load and, hence, have a finite service life. However, the conventional machine tool 21 is not adapted to detect the end of the service life of the coned disc springs 51. Therefore, the service life of the coned disc springs 51 may end during the operation of the machine tool 21, resulting in breakage of the coned disc springs 51. Depending on operating conditions of the machine tool 21 at the breakage, the time required for recovery from the breakage is disadvantageously prolonged.

Where the coned disc springs 51 are broken, there is a danger of breakage of other components depending on the conditions of the breakage of the coned disc springs 51. The breakage of a greater number of components prolongs the time required for repair of the components. This disadvantageously reduces the availability of the machine tool 21. If there are no spare coned disc springs 51, the machine tool 21 cannot be repaired until new coned disc springs 51 are delivered. This further reduces the availability of the machine tool 21.

In view of the foregoing, it is an object of the present invention to provide a machine tool which is adapted to detect the end of the service life of a spring of a clamp unit for fixing a tool to a spindle for systematic replacement of the spring.

SUMMARY OF THE INVENTION

In accordance with the present invention to achieve the aforesaid object, there is provided a machine tool, which comprises: a clamp unit for fixing a tool in a taper hole provided in a spindle, the clamp unit including a holder for holding a holder portion of the tool, a driving rod coupled to the holder, a driver for moving the driving rod along an axis thereof, and a spring for biasing the driving rod in one direction along the axis thereof, whereby the driving rod is moved along the axis thereof by the driver and the spring and the tool is fixed in the taper hole of the spindle with the holder portion thereof held by the holder; a controlling section for controlling the operation of the clamp unit; and a service life end detecting section for counting the number of times of actuation of the clamp unit and, when the count of the number reaches a predetermined reference actuation number, judging that the service life of the spring ends.

In the machine tool according to the present invention, the service life end detecting section counts the number of the times of the actuation of the clamp unit and, when the count of the number reaches the predetermined reference actuation number, judges that the service life of the spring ends.

The end of the service life of the spring which repeatedly operates under a constant repetitive load is detected on the basis of the number of the times of the operation of the spring. The number of the times that the spring is expected to operate before the end of the service life thereof is typically determined as an empirical value. Therefore, the end of the service life of the spring can be detected by counting the number of the times of the actuation of the clamp unit, more specifically, the number of the times of the operation of the spring. In the present invention, the known empirical value for the number of the times that the spring is expected to operate before the end of the service life thereof is employed as the reference actuation number. The number of the times of the actuation of the clamp unit is counted and, when the count of the number reaches the reference actuation number, it is judged that the service life of the spring ends.

Since the end of the service life of the spring can be thus detected by the service life end detecting section in accordance with the present invention, maintenance can systematically be carried out by preparing a spare spring and replacing the spring with the spare spring before the end of the service life of the spring. The availability of the machine tool can further be improved by performing the maintenance operation during an idle period of the machine tool in accordance with an operation plan of the machine tool. Therefore, the reduction in the availability of the machine tool can be prevented, because the breakage of the spring due to the end of the service life thereof during the operation of the machine tool can be prevented which may otherwise require a prolonged time for the recovery from the breakage.

The ratio of the count of the number to the reference actuation number may graphically be displayed on display means. By graphically displaying the ratio of the count of the number to the reference actuation number on the display means, an operator can recognize the degree of the fatigue of the spring at a glance. Through daily monitoring of the degree of the fatigue of the spring, the end of the service life of the spring can easily be predicted, so that a maintenance plan can easily be formulated.

DESCRIPTION OF THE PREFERRED EMBODIMENT

Figure 1:
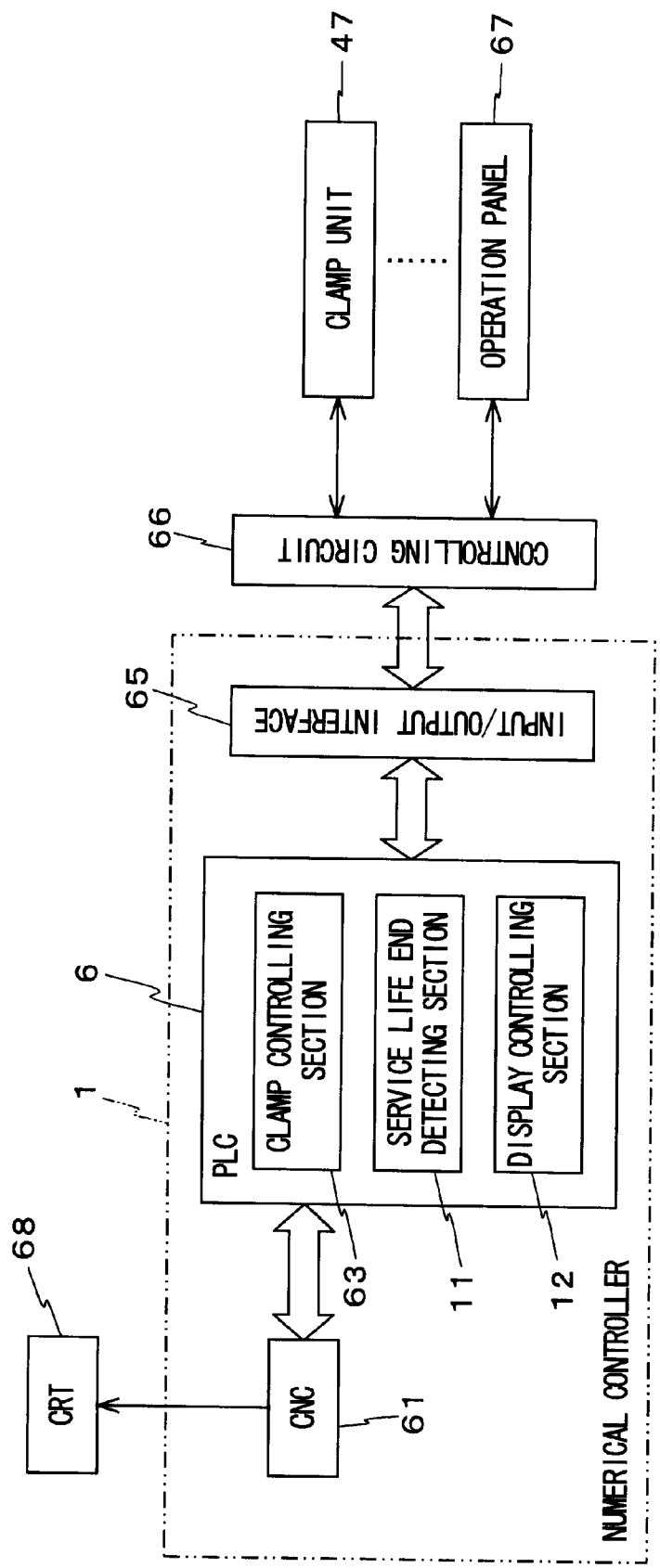
FIG. 1 is a block diagram illustrating a numerical controller and the like of the machine tool according to one embodiment of the present invention.
Figure 4:
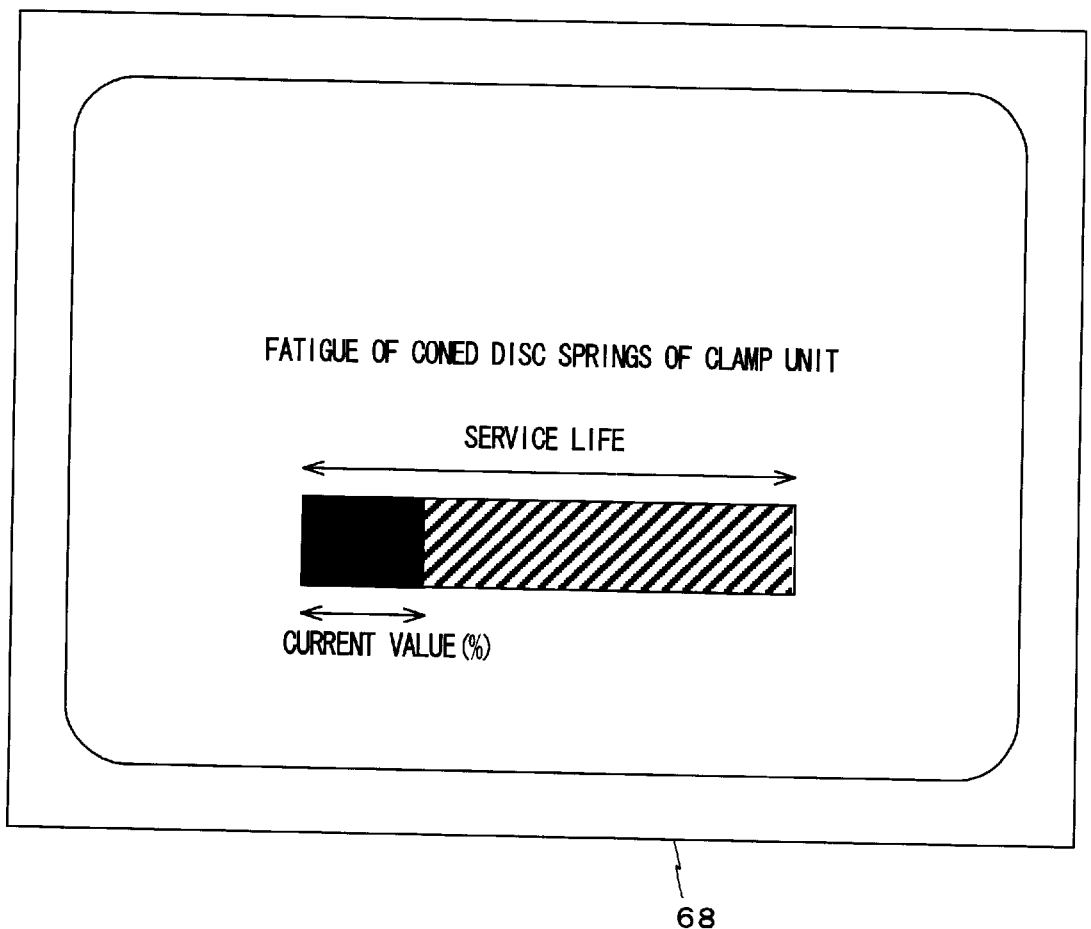
FIG. 4 is a diagram illustrating one exemplary display screen to be displayed on a CRT in accordance with the embodiment.
Figure 5:
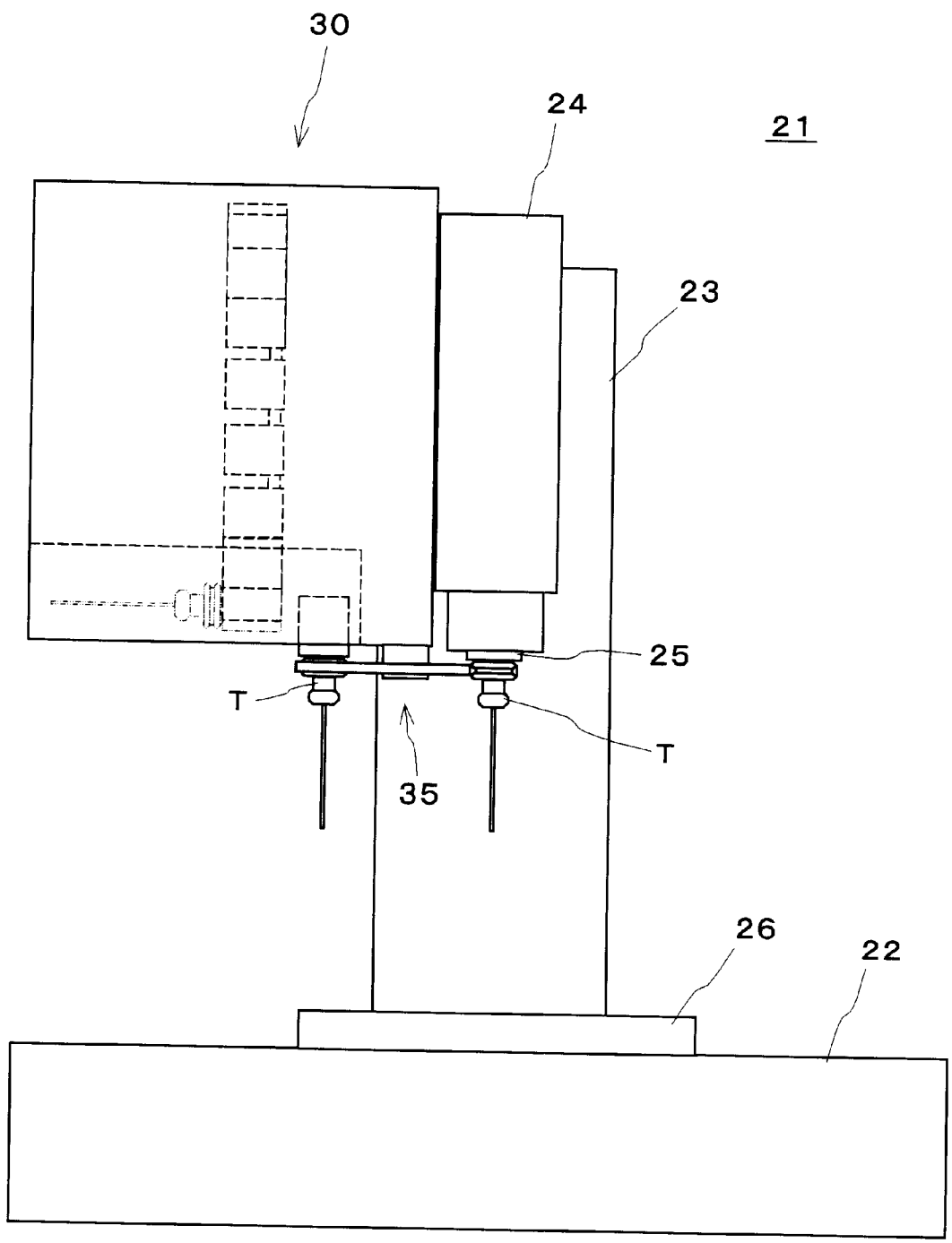
FIG. 5 is a front view illustrating a conventional machine tool as a whole.
Figure 6:
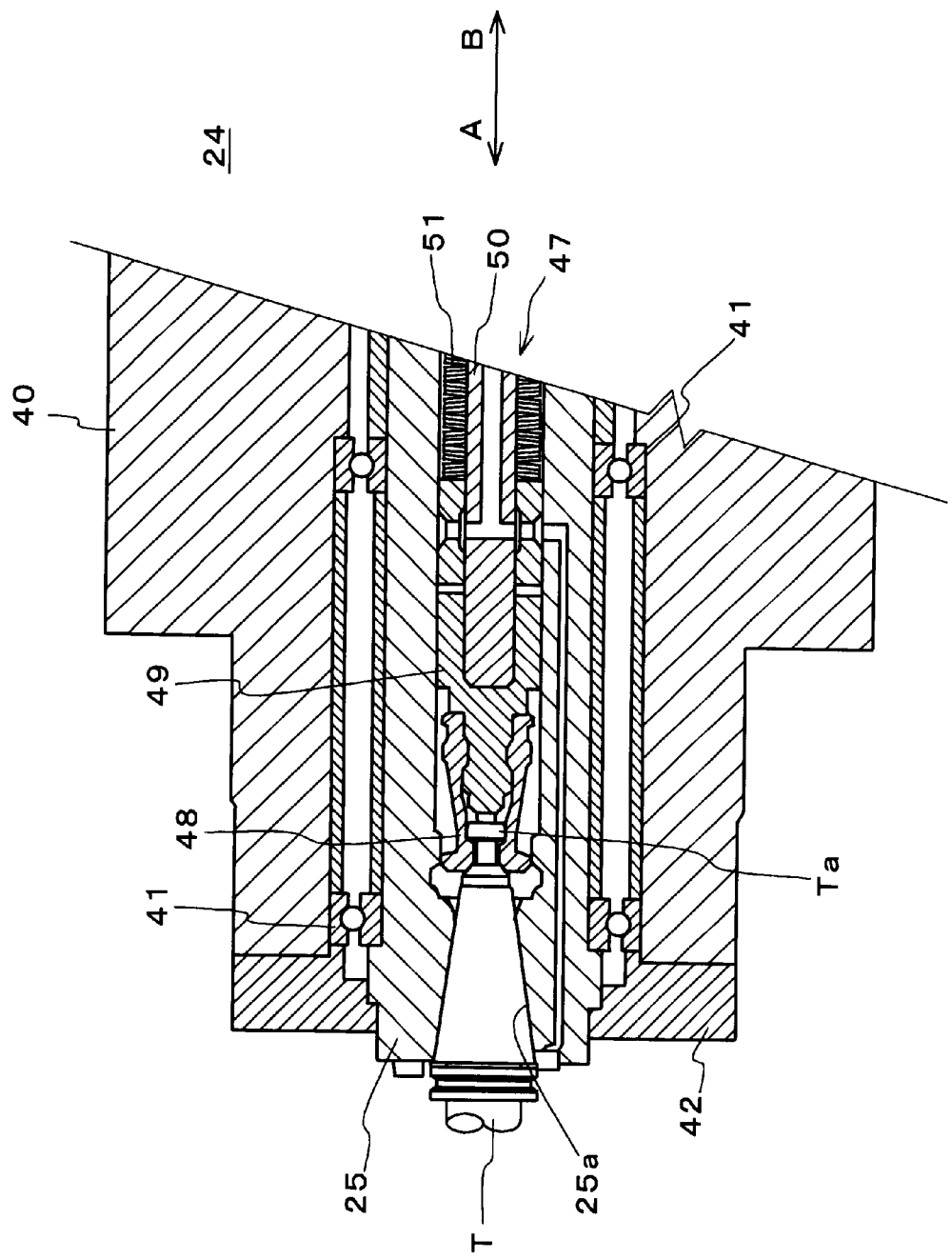
FIG. 6 is a sectional view illustrating a spindle head of the machine tool shown in FIG. 5.
Figure 7:
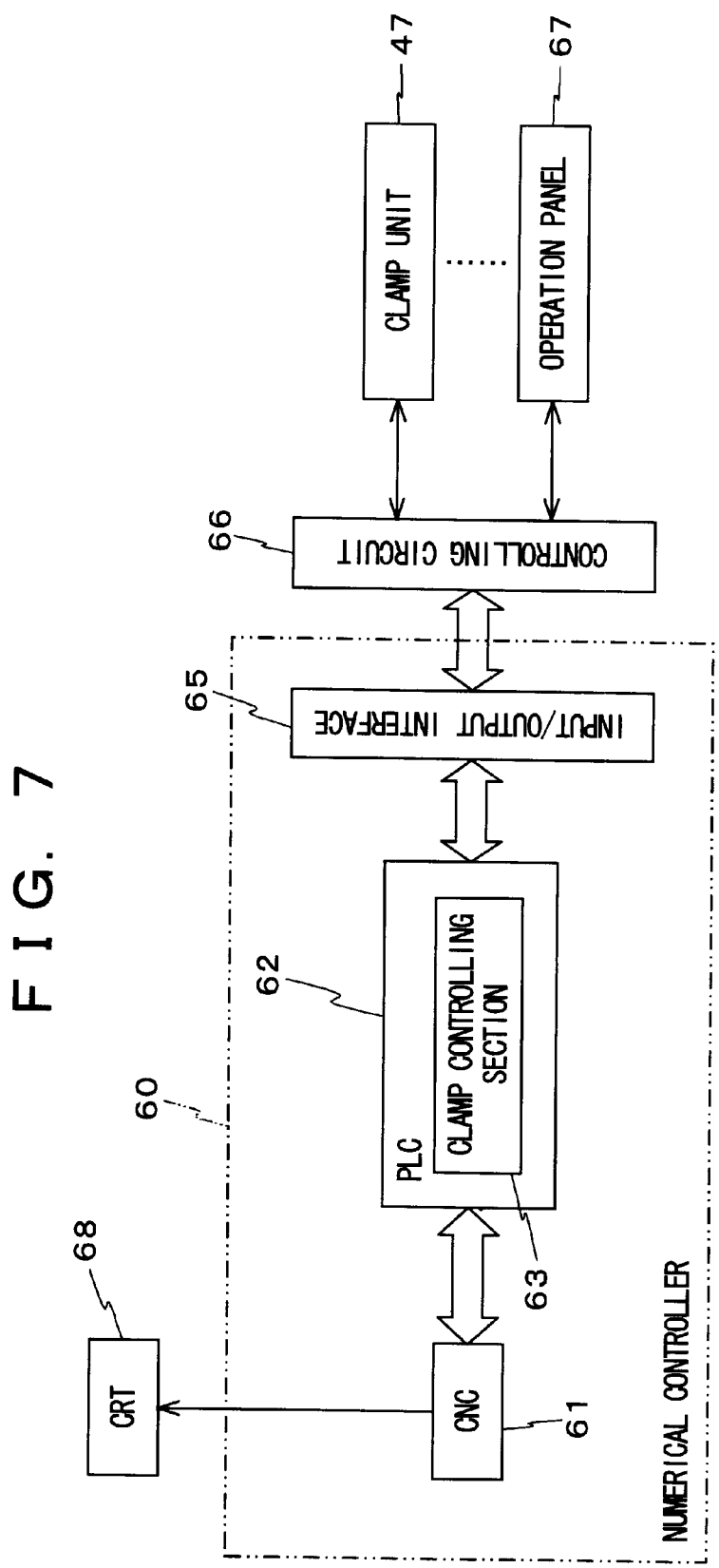
FIG. 7 is a block diagram illustrating a numerical controller and the like of the conventional machine tool.

A preferred embodiment of the present invention will hereinafter be described with reference to the attached drawings. FIG. 1 is a block diagram illustrating a numerical controller and the like of a machine tool according to this embodiment, and FIG. 4 is a diagram illustrating one exemplary display screen to be displayed on a CRT. The machine tool according to this embodiment is a modification of the conventional machine tool shown in FIGS. 5 to 7, and is different from the conventional machine tool in that the numerical controller has a different construction. Therefore, components equivalent to those of the conventional machine tool shown in FIGS. 5 to 7 will not be explained in detail, and will be denoted by like reference characters in FIGS. 1 and 4.

As shown in FIG. 1, the numerical controller 1 according to this embodiment includes a PLC 6 which has a different construction from the conventional PLC 62 in that the PLC 6 has additional functions and further includes a display controlling section 12 and a service life end detecting section 11.

The service life end detecting section 11 counts the number of times of actuation of the clamp unit 47. More specifically, the service life end detecting section 11 increments the count of the number by one whenever receiving a tool clamp command or a tool unclamp command applied from the CNC 61, and compares the count of the number with a predetermined reference value to judge whether or not the count of the number reaches the reference value. The count of the number and the reference value and, if it is judged that the count of the number reaches the reference value, a signal indicative of the judgment (service life end detection signal) are outputted to the display controlling section 12.

The reference value herein means the number of times that the clamp unit 47 is expected to be actuated before the end of the service life of the coned disc springs 51. The reference value is determined in the following manner, and stored in the service life end detecting section 11.

Figure 2:
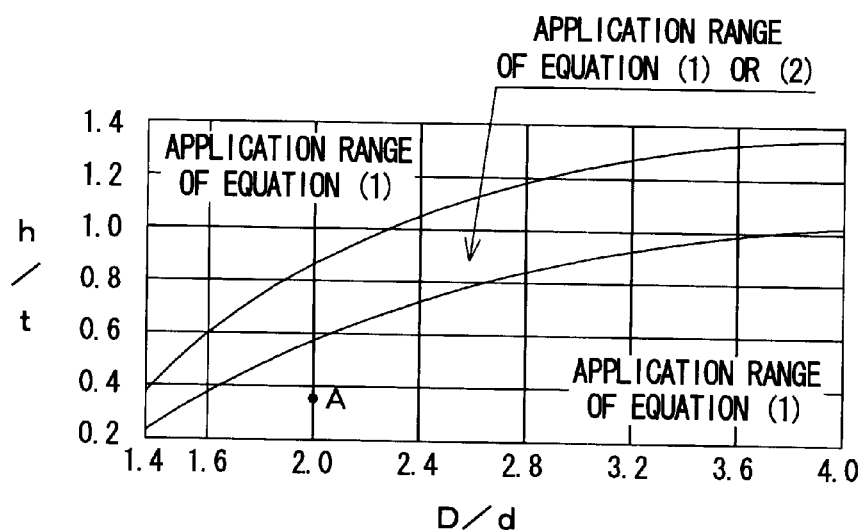
FIG. 2 is a characteristic diagram to be employed for determination of a reference value in the embodiment.

First, a mounting stress $\sigma_i$ exerted on the coned disc springs 51 and a maximum stress $\sigma_m$ exerted on the coned disc springs 51 under a maximum load are calculated from the following equations (1) and (2) on the basis of a graph as shown in FIG. 2. The equations (1) and (2) are Almen-Laszlo equations, and the graph of FIG. 2 defines application ranges of the equations (1) and (2).

$$\sigma_{t1} = \frac{4EC}{(1-v^2)D^2}\delta\left\{-\beta\left(h-\frac{\delta}{2}\right)+\gamma t\right\} \quad (1)$$

$$\sigma_{t2} = \frac{4EC}{(1-v^2)D^2}\frac{\delta}{\alpha}\left\{(2\gamma-\beta)\left(h-\frac{\delta}{2}\right)+\gamma t\right\} \quad (2)$$

wherein E is a Young's modulus, v is a Poisson's ratio, δ is the flexure of each coned disc spring 51, D is the outer diameter of each coned disc spring 51, β and γ are stress factors, h is the height of each coned disc spring 51, t is the thickness of the coned disc springs 51, and C is a factor obtained from an initial value.

Where a mounting load $P_1$ and a maximum load $P_m$ are 610 kg and 840 kg, respectively, and the coned disc springs 51 each have an outer diameter D of 54 mm, an inner diameter d of 25.4 mm, a height of 1.1 mm with a total thickness of 3.0 mm, for example, D/d and h/t are about 2.0 and about 0.37, respectively, which are plotted at a point A in FIG. 2. The point A belongs to the application range of the equation (1), so that the equation (1) is employed for the calculation of the mounting stress $\sigma_i$ and the maximum stress $\sigma_m$. The results of the calculation with the use of the equation (1) are shown in Table 1.

TABLE 1

|  | Load P (kg) | Flexure δ (mm) | Stress σ (kg/mm²) |
| --- | --- | --- | --- |
| Mounting (i) | 610 | 0.39 | 63 |
| Maximum (m) | 840 | 0.55 | 92 |

Figure 3:
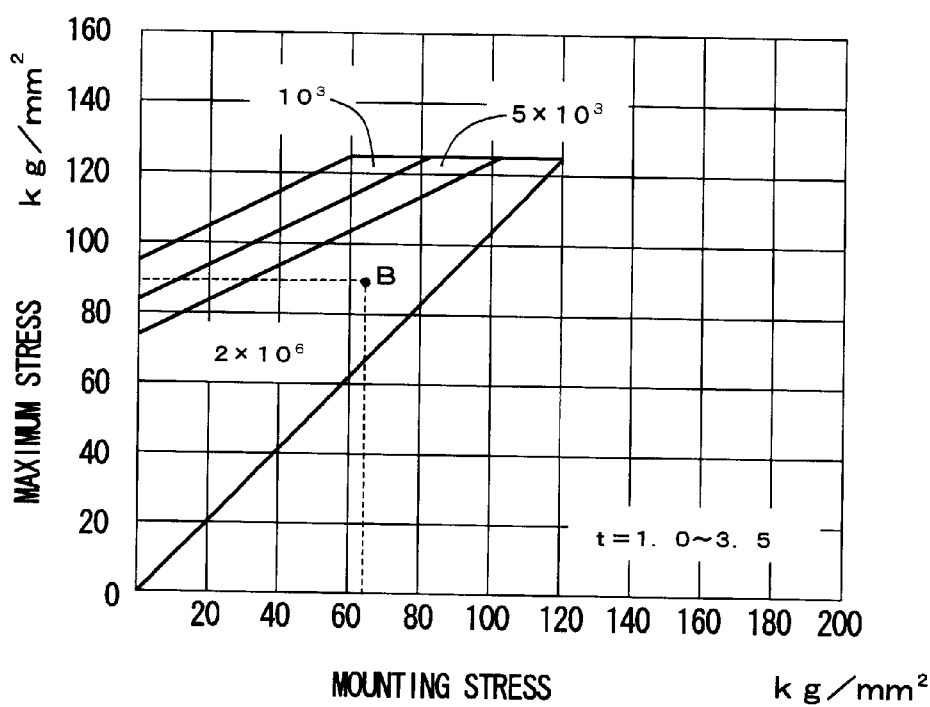
FIG. 3 is a characteristic diagram showing a relationship between the stress and the durability limit to be employed for the determination of the reference value in the embodiment.

Then, the number of the times that the coned disc springs 51 are expected to operate before the end of the service life thereof is determined on the basis of the mounting stress $\sigma_i$ and the maximum stress $\sigma_m$ thus calculated and a graph as shown in FIG. 3. The graph of FIG. 3 is an empirically obtained graph which indicates a durability limit determined on the basis of the mounting stress $\sigma_i$ and the maximum stress $\sigma_m$.

Where the mounting stress $\sigma_i$ and the maximum stress $\sigma_m$ are 63 kg/mm² and 92 kg/mm², respectively, which are plotted at a point B in FIG. 3, for example, the reference value (operation limit number) is $2 \times 10^6$. The reference value thus determined is stored in the service life end detecting section 11.

The display controlling section 12 receives the count of the number and the reference value from the service life end detecting section 11, and controls the CRT 68 via the CNC 61 to graphically display the ratio of the count of the number to the reference value as shown in FIG. 4. Further, the display controlling section 12 causes the CRT 68 to display a message requesting the replacement of the coned disc springs 51 upon reception of the service life end detection signal from the service life end detecting section 11. In a display screen shown in FIG. 4, the reference value is displayed as SERVICE LIFE and the count of the number is displayed as CURRENT VALUE (%). Therefore, an operator can recognize the degree of the fatigue of the coned disc springs 51 at a glance.

In the numerical controller 1 having the aforesaid construction in accordance with this embodiment, the service life end detecting section 11 increments the count of the number by one whenever receiving the tool clamp command or the tool unclamp command applied from the CNC 61 to the PLC 6 during the execution of a machining program or by a manual operation. Then, the service life end detecting section 11 compares the count of the number with the predetermined reference value to judge whether or not the count of the number reaches the reference value.

If the service life end detecting section 11 judges that the count of the number reaches the reference value, the message requesting the replacement of the coned disc springs 51 is displayed on the CRT 68. Further, the ratio of the count of the number to the reference value is graphically displayed on the CRT 68 as shown in FIG. 4, so that the operator can recognize the degree of the fatigue of the coned disc springs 51 at a glance.

According to this embodiment, the end of the service life of the coned disc springs 51 is detected by the service life end detecting section 11. Therefore, maintenance can systematically be carried out by preparing spare coned disc springs 51 and replacing the coned disc springs 51 with the spare coned disc springs 51 before the end of the service life of the coned disc springs 51. The availability of the machine tool 21 can further be improved by performing the maintenance operation during an idle period of the machine tool 21 in accordance with an operation plan of the machine tool 21. Since the degree of the fatigue of the coned disc springs 51 is displayed on the CRT 68, the end of the service life of the coned disc springs 51 can easily be predicted through daily monitoring of the degree of the fatigue of the coned disc springs 51. Therefore, a maintenance plan can easily be formulated.

In this embodiment, the end of the service life of the coned disc springs 51 is indicated by displaying the message requesting the replacement of the coned disc springs 51 on the CRT 68, but may be indicated by lighting an alarm lamp or beeping an alarm beeper.

Although the coned disc springs 51 are employed as a spring for the clamp unit 47 in the embodiment described above, any other spring such as a coil spring may be employed instead of the coned disc springs 51 in the present invention.

Further, the method for the determination of the reference value (operation limit number) for the coned disc springs 51 is not limited to that described above, but any other proper methods may be employed for the determination of the reference value.

What is claimed is:

1. A machine tool comprising:
   a spindle, a clamp unit for fixing a tool in a taper hole provided in the spindle, the clamp unit including a holder for holding a holder portion of the tool, a driving rod coupled to the holder, a driver for moving the driving rod along an axis thereof, and a spring for biasing the driving rod in one direction along the axis thereof, whereby the driving rod is moved along the axis thereof by the driver and the spring and the tool is fixed in the taper hole of the spindle with the holder portion thereof held by the holder;
   a controlling section for controlling an operation of the clamp unit; and
   a service life end detecting section for counting a number of times of actuation of the clamp unit and, when a count of the number reaches a predetermined reference actuation number, judging that a service life of the spring ends.

2. A machine tool as set forth in claim 1, further comprising display means for graphically displaying a ratio of the count of the number to the reference actuation number.

* * * * *